US010194096B2

(12) United States Patent
Vuskovic et al.

(10) Patent No.: US 10,194,096 B2
(45) Date of Patent: *Jan. 29, 2019

(54) SYSTEM AND METHOD FOR OPTIMIZING VIDEOS USING OPTIMIZATION RULES

(71) Applicant: Google Inc., Mountain View, CA (US)

(72) Inventors: Vladimir Vuskovic, Zollikerberg (CH); Dhruv Bakshi, Zurich (CH); Amaury Forgeot d'Arc, Uster (CH); Christoph Poropatits, London (GB)

(73) Assignee: Google LLC, Mountain View, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 14/860,504

(22) Filed: Sep. 21, 2015

(65) Prior Publication Data

US 2016/0150162 A1    May 26, 2016

Related U.S. Application Data

(63) Continuation of application No. 13/632,998, filed on Oct. 1, 2012, now Pat. No. 9,143,823.

(51) Int. Cl.
*H04N 5/262* (2006.01)
*G06K 9/62* (2006.01)
(Continued)

(52) U.S. Cl.
CPC ....... *H04N 5/262* (2013.01); *G06F 17/30038* (2013.01); *G06K 9/00718* (2013.01); *G06K 9/6256* (2013.01); *G11B 27/031* (2013.01); *H04N 7/12* (2013.01); *H04N 21/23424* (2013.01); *H04N 21/23439* (2013.01); *H04N 21/25825* (2013.01); *H04N 21/2668* (2013.01);

*H04N 21/2743* (2013.01); *H04N 21/4312* (2013.01); *H04N 21/4355* (2013.01); *H04N 21/44016* (2013.01); *H04N 21/4722* (2013.01);
(Continued)

(58) Field of Classification Search
None
See application file for complete search history.

(56) References Cited

U.S. PATENT DOCUMENTS 7,965,203 B2   6/2011  Yamagishi et al.
8,079,054 B1  12/2011  Dhawan et al.
(Continued)

FOREIGN PATENT DOCUMENTS

CA    2794680 A1   11/2011
CN    1647504 A     7/2005
(Continued)

OTHER PUBLICATIONS

European Patent Office, "Supplementary European Search Report" for European Application No. 13844281.9, dated Apr. 22, 2016, 9 pages.
(Continued)

*Primary Examiner* — Hoang Vu A Nguyen Ba
(74) *Attorney, Agent, or Firm* — Lowenstein Sandler LLP

(57) ABSTRACT

A computing device executing an optimizer analyzes a video. The computing device identifies one or more optimizations for the video based on the analysis, the one or more optimizations pertaining to a modification of original contents of the video. The computing device implements the one or more optimizations for the video.

20 Claims, 9 Drawing Sheets

(51) Int. Cl.

| | | |
|---|---|---|
| G06K 9/00 | (2006.01) |
| G11B 27/031 | (2006.01) |
| H04N 21/2343 | (2011.01) |
| H04N 21/2668 | (2011.01) |
| H04N 21/44 | (2011.01) |
| H04N 21/431 | (2011.01) |
| H04N 21/234 | (2011.01) |
| H04N 21/258 | (2011.01) |
| H04N 21/435 | (2011.01) |
| H04N 21/81 | (2011.01) |
| H04N 21/475 | (2011.01) |
| H04N 21/4722 | (2011.01) |
| G06F 17/30 | (2006.01) |
| H04N 21/2743 | (2011.01) |
| H04N 21/854 | (2011.01) |
| H04N 21/84 | (2011.01) |
| H04N 7/12 | (2006.01) |

(52) U.S. Cl.
CPC ....... *H04N 21/4756* (2013.01); *H04N 21/812* (2013.01); *H04N 21/8126* (2013.01); *H04N 21/84* (2013.01); *H04N 21/85403* (2013.01)

(56) References Cited

U.S. PATENT DOCUMENTS

| | | | |
|---|---|---|---|
| 8,645,991 B2 | 2/2014 | McIntire et al. | |
| 2003/0198405 A1* | 10/2003 | Ali | H04N 5/14 382/307 |
| 2004/0055018 A1 | 3/2004 | Stone | |
| 2004/0123327 A1* | 6/2004 | Fai Ma | H04N 5/44513 725/100 |
| 2005/0114319 A1 | 5/2005 | Brent et al. | |
| 2006/0100987 A1 | 5/2006 | Leurs | |
| 2007/0250901 A1* | 10/2007 | McIntire | H04N 7/17318 725/146 |
| 2007/0297755 A1* | 12/2007 | Holt | G11B 27/034 386/240 |
| 2009/0012995 A1 | 1/2009 | Sartor et al. | |
| 2009/0199230 A1 | 8/2009 | Kumar et al. | |
| 2009/0300475 A1* | 12/2009 | Fink | G06F 17/3082 715/230 |
| 2010/0082423 A1 | 4/2010 | Nag et al. | |
| 2011/0125572 A1 | 5/2011 | Cantu-Paz et al. | |
| 2011/0264700 A1 | 10/2011 | Mei et al. | |
| 2012/0139932 A1 | 6/2012 | Sakamoto | |
| 2014/0019862 A1 | 1/2014 | Fink et al. | |
| 2014/0304731 A1* | 10/2014 | Dhawan | G06Q 30/00 725/32 |

FOREIGN PATENT DOCUMENTS

| | | | | |
|---|---|---|---|---|
| CN | 1647504 | * | 7/2006 | ............. G06N 3/126 |
| CN | 102084319 A | | 6/2011 | |
| CN | 102695062 | * | 9/2012 | ............. H04N 9/64 |
| CN | 102695062 A | | 9/2012 | |
| JP | 2002010135 A | | 1/2002 | |
| JP | 2003008977 A | | 1/2003 | |
| JP | 2005167377 A | | 6/2005 | |
| JP | 2009239335 A | | 10/2009 | |
| JP | 2011024067 A | | 2/2011 | |
| WO | 2008/016634 A2 | | 2/2008 | |
| WO | WO 2008/016634 | * | 2/2008 | ............. G06Q 10/00 |
| WO | 2008033840 A2 | | 3/2008 | |
| WO | WO2008033840 A2 | | 3/2008 | |
| WO | 2010078650 A1 | | 7/2010 | |
| WO | 2012098470 A1 | | 7/2012 | |

OTHER PUBLICATIONS

International Search Report and the Written Opinion for International Application No. PCT/US2013/062930, dated Feb. 2, 2014, 12 pages.

* cited by examiner

Prepare Video Optimizations

| | Video | Enable | Disable | Leave unchanged |
|---|---|---|---|---|
| 152 | Public viewing | ● | ○ | ○ |
| 154 | Ratings | ○ | ○ | ● |
| 156 | Embedding | ○ | ○ | ● |
| 158 | Off-web Syndication | ○ | ○ | ● |
| 160 | Block Outside Ownership | ○ | ○ | ● |
| 174 | Comments | Leave unchanged ⇕ | | |
| 176 | Responses | Leave unchanged ⇕ | | |
| 178 | Racy | Leave unchanged ⇕ | | |
| 180 | Add Tags | | | |
| | Remove Tags | | | |
| 182 | New Category | Leave unchanged ⇕ | | |
| | Advertising | Enable | Disable | Leave unchanged |
| 162 | Overlay In-video Ads | ○ | ○ | ● |
| | TrueView In-stream Ads | ○ | ○ | ● |
| | Standard In-stream Ads | ○ | ○ | ● |
| | Pre-roll Ads | ○ | ○ | ● |
| | Post-roll Ads | ○ | ○ | ● |
| 172 | Use for FP Matching | ○ | ○ | ● |

Preview...

FIGURE 1B

SYSTEM AND METHOD FOR OPTIMIZING VIDEOS USING OPTIMIZATION RULES

CROSS-REFERENCE TO RELATED APPLICATIONS

This patent application is a continuation of U.S. Non-Provisional application Ser. No. 13/632,998, filed Oct. 1, 2012, entitled "PROVIDING SUGGESTIONS FOR OPTIMIZING VIDEOS TO VIDEO OWNERS" which is incorporated herein by reference for all purposes.

TECHNICAL FIELD

Implementations of the present disclosure relate to online video hosting services, and more specifically to a system for identifying optimizations for videos and for suggesting such optimizations to video owners.

BACKGROUND

Many video hosting websites allow entities to post videos. Users can then view those videos. Such videos can be monetized by associating advertisements to the videos. Users who view a video may also be presented with the advertisements, and the entity that uploaded the video may be paid based on the users who viewed the video. Improvements to the videos may increase a number of users who view the videos, and thus increase revenues of the entity that controls the videos. However, it may be difficult for the entity to determine how the video should be changed to improve it.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an implementation of the present disclosure, a computing device executing an optimizer analyzes a video. The computing device identifies one or more optimizations for the video based on the analysis. The computing device suggests the one or more optimizations to an entity associated with the video. In response to the entity accepting the one or more optimizations, the computing device implements the one or more optimizations for the video.

In addition, methods and systems for performing the operations of the above described implementations are also implemented. Further, a computer readable storage media is provided to store instructions for performing the operations of the above described implementations.

BRIEF DESCRIPTION OF THE DRAWINGS

The present disclosure will be understood more fully from the detailed description given below and from the accompanying drawings of various implementations of the disclosure.

FIG. 1B illustrates an optimization template for recommending optimizations for a video, in accordance with one implementation of the present disclosure.

DETAILED DESCRIPTION

Users and other entities that generate and upload videos to video hosting websites may not always apply best practices when generating those videos. Moreover, such best practices may be unknown or difficult to identify. Accordingly, described herein are a system and method for identifying optimizations for videos, recommending the identified optimizations, and implementing the identified optimizations. Administrators may view a video and manually select one or more video optimizations to suggest to a video owner. Examples of optimizations include enabling one or more features for the video, adding a custom thumbnail, editing tags, a title and/or a description of the video, editing contents of the video, and so on. Alternatively, or additionally, a video optimizer may analyze the video by applying one or more optimization rules to identify optimizations that may be made to the video. The video optimizer may then suggest those optimizations to the video owner. In response to the entity accepting the one or more optimizations, the video optimizer may automatically modify the video to implement the suggested optimizations. The suggested optimizations may cause the video to achieve an increased viewership, increased advertising revenue, increased viewer time, and so on.

Note that some implementations of the present disclosure are discussed with reference to videos. Such videos may be digital videos, and may be encoded in numerous different formats, such as the Windows Media®, Real Media®, Audio Video Standard (AVS), Theora®, VP8, WebM, VC-1, Quicktime®, MPEG-4 (also known as MP4), Flash®, MPEG-2, DivX®, audio video interlace (AVI), or advanced video coding (AVC) video file formats. Though implementations are discussed with reference to videos, implementations of the present disclosure also apply to other digital media items such as images and audio files. Examples of audio files to which implementations of the present disclosure may apply include digital music and other audio clips such as moving picture experts group (MPEG) audio layer 3 (MP3) files, advanced audio coding (AAC) files, waveform audio file format (WAV) files, audio interchange file format (AIFF) files, Apple® Lossless (m4A) files, etc. Examples of image files to which the implementations of the present disclosure may apply include joint photographic experts group (JPEG) files, portable network graphics (PNG) files, bitmap image (BMP) files, graphics interchange format (GIF) files, and so forth.

Figure 1A:
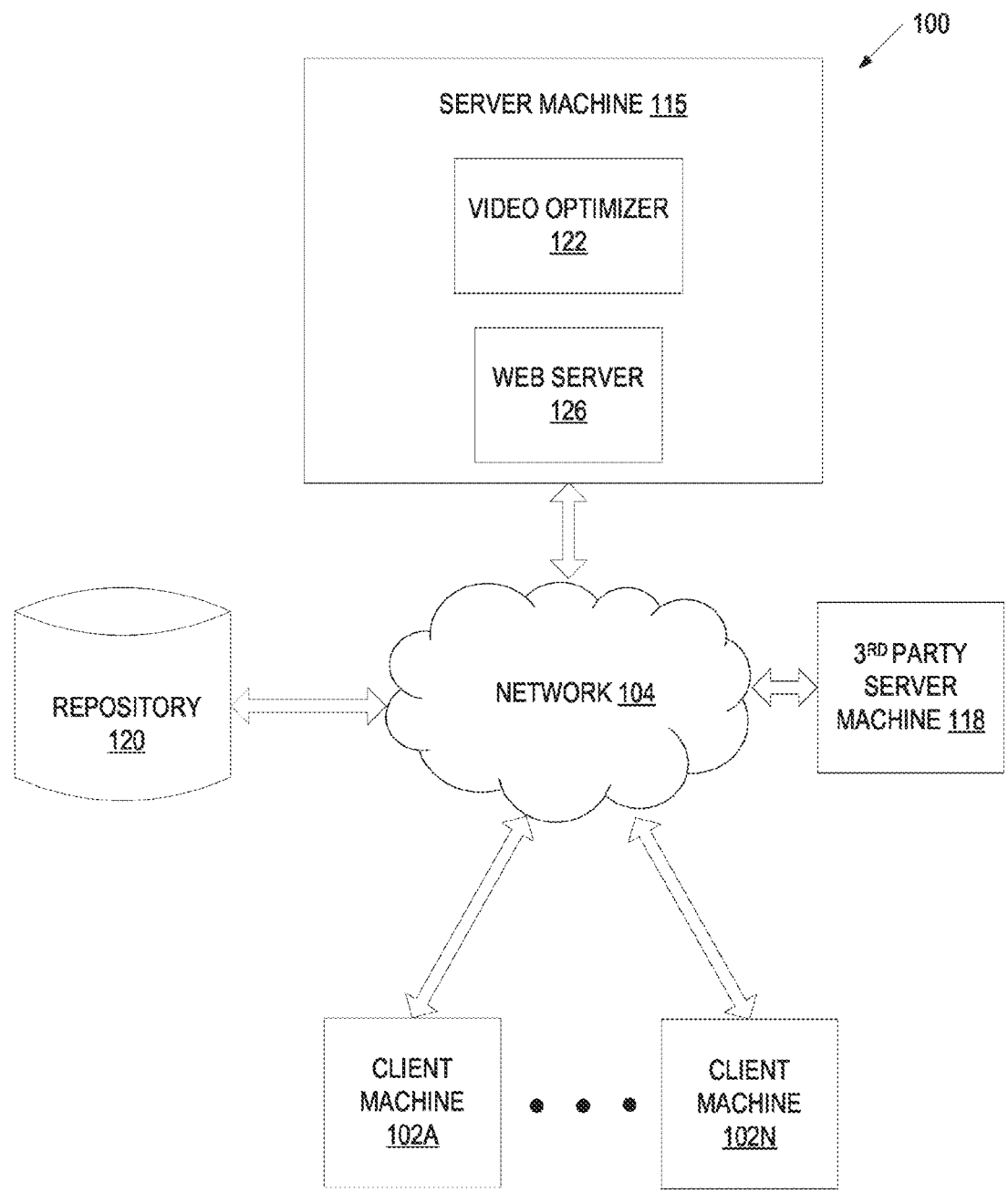
FIG. 1A illustrates an exemplary system architecture, in accordance with one implementation of the present disclosure.

FIG. 1A illustrates an example system architecture 100, in accordance with one implementation of the present disclosure. The system architecture 100 includes a server machine 115, a repository 120 and client machines 102A-102N connected to a network 104. The system architecture 100 may also include a third party server machine 118 connected to the network 104. Network 104 may be a public network (e.g., the Internet), a private network (e.g., a local area network (LAN) or wide area network (WAN)), a cellular network, a broadcast network, or a combination thereof.

The client machines 102A-102N may be personal computers (PCs), laptops, mobile phones, tablet computers, or any other computing devices. The client machines 102A-102N may run an operating system (not shown) that manages hardware and software of the client machines 102A-102N. A browser (not shown) may execute on the client machines (e.g., on the OS of the client machines). The browser may be a web browser that can access content served by a web server 126. The browser may issue queries and commands to the web server 126, such as commands to access a specific video, commands to share a video, commands to optimize the video, and so forth. The client machines 102A-102N may also upload videos to the web server 126 for storage in a repository 120.

Server machine 115 may be a rackmount server, a router computer, a personal computer, a portable digital assistant, a mobile phone, a laptop computer, a tablet computer, a netbook, a desktop computer, a media center, or any combination of the above. Server machine 115 includes web server 126 and a video optimizer 122. In alternative implementations, the web server 126 and video optimizer 122 execute on different machines. Additionally, in some implementations, the web server 126 and video optimizer 122 are combined into a single component.

Repository 120 is a persistent storage that is capable of storing video files. As will be appreciated by those skilled in the art, in some implementations repository 120 might be a network-attached file server, while in other implementations repository 120 might be some other type of persistent storage such as an object-oriented database, a relational database, and so forth, that may be hosted by the server machine 115 or one or more different machines coupled to the server machine 115 via the network 104. The video stored in the repository 120 may include user generated content that is uploaded by client machines 102A-102N. The video may additionally or alternatively include content provided by other entities (e.g., service providers such as news organizations, publishers, libraries and so on).

Web server 126 may receive videos from client machines (also referred to herein as clients) 102A-102N and/or a third party server machine 118, and store those videos in repository 120. Web server 126 may additionally serve videos from repository 120 to client machines 102A-102N. Accordingly, web server 126 may provide a media hosting service.

Web server 126 may receive search queries from clients 102A-102N and perform searches on the videos in the repository 120 to determine videos that satisfy the search queries. Web server 126 may send to a client 102A-102N those videos that match a search query. Clients 102A-102N may also browse contents of the repository 120. For example, clients may select in a web page specific tabs or filters associated with particular categories of content. Web server 126 may then present videos associated with those particular categories to the clients 102A-102N.

Web server 126 may additionally select advertisements (ads) and send the ads to clients 102A-102N. The ads may include in-stream ads, in-video ads, overlay ads, and so forth. In-stream ads may include pre-roll ads that are shown before a video starts, mid-roll (or intermission) ads that interrupt playback of the video momentarily, and post-roll ads that are shown after the video ends. Overlay ads are text and image based ads shown over a portion of a video while the video is playing. In-video ads are a type of overlay ad that, if accessed, causes the video to pause and a video advertisement to be played, after which the video resumes.

Web server 126 may stream selected videos to clients 102A-102N, or may download the videos to the clients 102A-102N. In streaming, the clients 102A-102N can begin playback of the video before receiving the entire video. In contrast, with downloading the video typically is not playable until a complete file is received by the client 102A-102N.

Video optimizer 122 may analyze videos, and identify modifications that may be made to analyzed videos to optimize those videos. Video optimizer 122 may then issue optimization recommendations to entities that control the videos. Such entities may be entities that uploaded the videos or entities that otherwise have legal rights to the videos. As used herein, an entity may be a user, a business entity, or any other individual or organization. In one implementation, the optimization recommendations are delivered to the entities via email, instant messages, text messages (e.g., SMS or MMS), or other messaging mediums. Video optimizer 122 may also post optimization recommendations to an account of the entity. Therefore, the entity may see and act on the optimization recommendations when the entity next accesses the account.

Video optimizer 122 may also provide an interface that enables administrators (e.g., partner managers that help video owners to monetize their videos) to provide optimization suggestions to video owners. Administrators may review a video to determine one or more properties of the videos. The video optimizer 122 may provide an optimization template or form for the administrator to fill out via a user interface such as a graphical user interface (GUI). Video optimizer 122 may then suggest optimizations for the analyzed video to the video owner based upon the filled out optimization template.

FIG. 1B illustrates one example optimization template 150 that may be filled out, for example, by a partner manager. As shown, a partner manager may select whether to enable, disable or leave unchanged multiple options, which may include a public viewing option 152, a ratings option 154, an embedding option 156, an off-web syndication option 158 (which permits the video hosting server to syndicate a video in an off web experience), a block outside ownership option 160, one or more advertisement options 162 and a use for FP matching option 172 (which causes the video to be used to generate a fingerprint to detect similar videos), for example. The partner manager may also recommend that the video owner add comments 174 and/or responses 176 for the video via the template 150. Additionally, the partner manager may suggest that specific tags be added or removed via text boxes 180. The partner manager may also suggest a new categorization 182 for the video and/or that the video be classified as racy 178. Once the partner manager has filled out the optimization template 150 (e.g., via a GUI), he may enter a submit command via the GUI, which may cause one or more optimization suggestions to be generated and sent to the video owner based on the optimization template. If the video owner accepts the optimization suggestions, then the video optimizer may implement the suggested optimizations.

Returning to FIG. 1A, in some implementations, video optimizer 122 provides an application programming interface (API) that may be accessed by client machines 102A-102N and/or the third party server machine 118. Using the API for the video optimizer 122, the client machines 102A-102N and/or third party server machine 118 may select videos (or a single video) and initiate analysis, recommendation and/or optimization for the videos.

Figure 2:
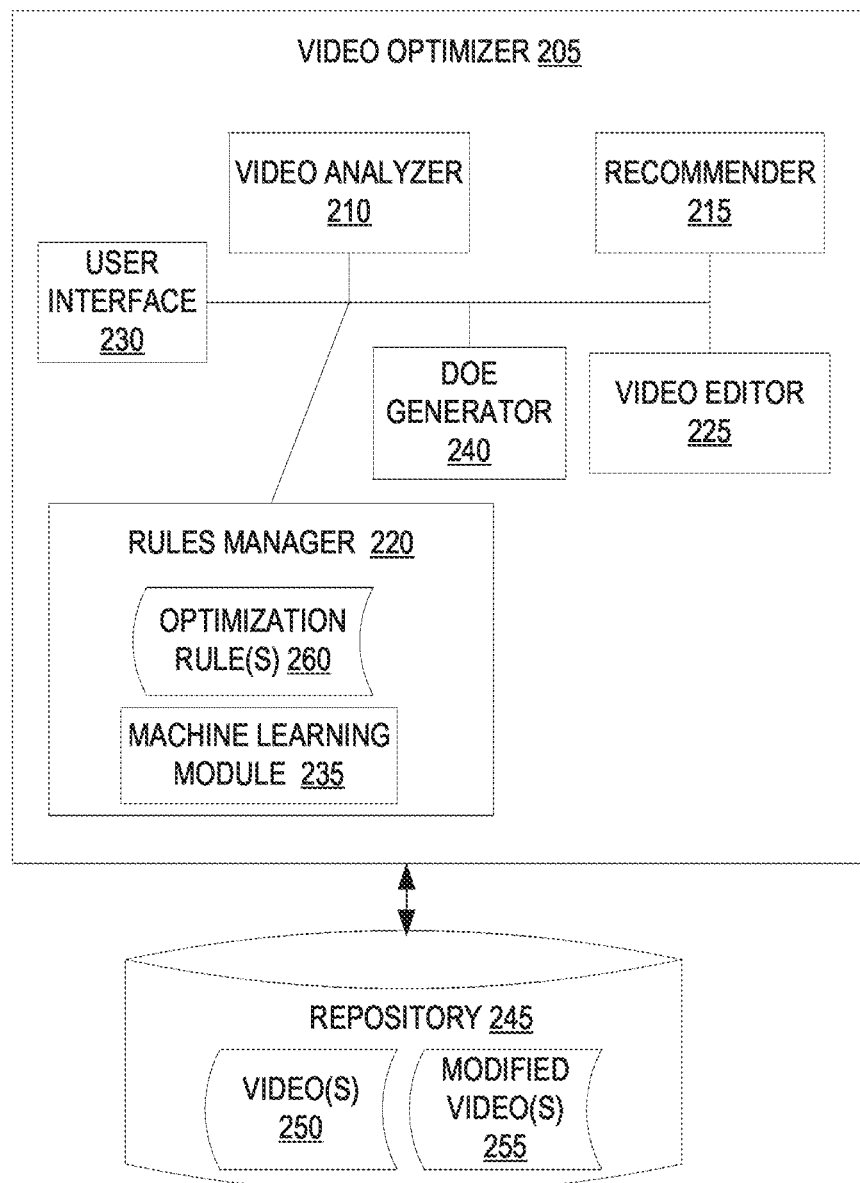
FIG. 2 is a block diagram of a video optimizer, in accordance with one implementation of the present disclosure.

FIG. 2 is a block diagram of a video optimizer 205, in accordance with one implementation of the present disclosure. The video optimizer 205 may include a user interface 230, a video analyzer 210, a recommender 215, a rules manager 220, a video editor 225 and/or a design of experiments (DOE) generator 240. Note that in alternative implementations, the functionality of one or more of the user interface 230, video analyzer 210, recommender 215, rules manager 220, video editor 225 and/or DOE generator 240 may be combined into a single module or divided into multiple modules. In one implementation, video optimizer 205 corresponds to video optimizer 122 of FIG. 1.

Video analyzer 210 analyzes videos to identify changes that may be made to the videos to optimize the videos. Video analyzer 210 may be invoked by a user via user interface 230, or may be automatically invoked by video optimizer 205. In one implementation, video analyzer 210 is automatically invoked when a new video is uploaded to a web server. Video analyzer 210 may then analyze the uploaded video to identify optimizations for a video before the video is made publicly available. Video analyzer 210 may additionally or alternatively analyze previously uploaded videos 250, which may be stored in a repository 245. In one implementation, video analyzer 210 analyzes videos 250 that have been selected by an entity via the user interface 230. Video analyzer 210 may also analyze videos 250 uploaded by a specific entity or entities, or systematically analyze some or all uploaded videos 250 (e.g., based on upload date and/or when the videos were last optimized). For example, video analyzer 210 may analyze videos 250 periodically and/or as new optimization rules become available or existing optimization rules are refined.

In one implementation, video analyzer 210 is a rules engine that determines optimizations for a video based on a set of optimization rules 260. Video analyzer 210 may be a rules engine that processes optimization rules 260 to produce outcomes. The video analyzer 210 may match facts, data and optimization rules 260, and infer conclusions which may result in actions or events. In one implementation, the video analyzer 210 matches the facts, data and rules 260 using a Rete Algorithm. The video analyzer 210 may also use a Linear Algorithm, Treat Algorithm, Leaps Algorithm, or other algorithm. Hybrid algorithms that use combinations of, for example, the Leaps Algorithm and the Rete Algorithm, may also be used.

Optimization rules 260 may perform actions, provide information, generate recommendations, etc. An optimization rule 260 may include conditional elements (e.g., and, or, not, exists, etc.), constraints (e.g., equal to, not equal to, greater than, contains, etc.) and consequences or actions (e.g., generate recommendation, process next rule, edit video, etc.). Some optimization rules may output one or more suggestions for executable optimizations that can be accepted to implement changes to an analyzed video. Some optimization rules 260 may output one or more suggestions for non-executable optimizations that may be incorporated into future videos. Some optimization rules 260 may output suggestions for both executable and non-executable optimizations. An optimization rule 260 may also perform other functions.

Generated optimization suggestions may be generic or specific. Generic suggestions may suggest that a user perform a particular type of optimization (e.g., adding more tags, improving a title or description, etc). Specific suggestions may suggest that particular optimizations be performed, such as adding specific tags to a video, using a specific custom thumbnail for a video, and so on.

Each optimization rule 260 may check the video for one or more inefficiencies, deficiencies, errors, and so forth. Each optimization rule 260 may further include one or more optimizations that may be performed on the analyzed video. Optimization rules 260 may be used to examine contents of a video (e.g., image contents, audio contents, etc.) as well as metadata associated with the video (e.g., tags, titles, descriptions, etc.). The types of analyses performed by the optimization rules 260 may vary based on the rule, and may include performing image analysis (e.g., on one or more frames in the video), image recognition, image classification, and so forth. For example, an optimization rule may perform image recognition on images in the video to identify objects in the video. These object identifications may then be used by the optimization rule or as inputs for other optimization rules. In a further example, say that as a result of performing image recognition, an optimization rule identified dancers in the video. The optimization rule could then suggest that a dancing tag be added to the video, and another optimization rule could further suggest that the term dance be added to a title of the video. The analyses may also include parsing the image's metadata. This parsed metadata may be used as an input for optimization rules, which may determine whether the metadata complies with known optimal metadata parameters (e.g., if enablement option selections are optimal, if advertisement option selections are optimal, if a description is optimal, if a custom thumbnail is present, if tags are optimal, and so forth).

Optimization rules 260 may be configured to optimize specific types of videos. For example, there may be different optimization rules for optimizing children's videos than for optimizing music videos. Additionally, some optimization rules 260 may provide different optimization suggestions based on a type of video being analyzed. If a video's type has not been identified, then optimization rules 260 may identify the video's type, and may suggest that the video be classified as a video of the identified type (e.g., by adding a tag to the video).

Optimization rules 260 may also be configured to optimize for different results. For example, some optimization rules may be configured to optimize for maximum revenues, while other optimization rules may be configured to optimize for maximum viewership, maximum viewer time, maximum discoverability, and so forth.

In one implementation, there are multiple different classes of optimization rules 260. Examples of optimization rule classes include a monetization class, a video enablements class, a video discoverability class, an author behavior class and a video contents class. More or fewer optimization classes may also be used. Note also that the optimization rule class structure is one logical structure that can be used to organize the optimization rules 260. The optimization rules 260 may alternatively be unorganized, or may be organized according to some other logical structure or methodology.

Monetization class optimization rules include rules that check for types of advertisements and/or optimizations of advertisements that may be used with a video. Monetization class optimization rules may include rules to check whether in-video advertisements (ads) are enabled, whether in-stream ads are enabled, whether overlay ads are enabled, whether a monetize policy has been enabled for the video, and so forth. The monetization class optimization rules may also identify optimal types of advertisements. Additionally, monetization class optimization rules may identify optimal screen placement for ads, optimal size for ads, and so forth.

If certain types of advertisements are disabled, then the monetization class optimization rules may output suggestions to enable those advertisement types. Additionally, if advertising properties are sub-optimal (e.g., advertisement is too large, too small, improperly placed, etc.), then the monetization class optimization rules may output suggestions to modify the advertising properties.

Video enablements class optimization rules include rules to check whether one or more options are enabled for a video. Video enablements class optimization rules may include rules to check whether embedding is enabled (which enables the video to be embedded in third party websites), whether off-web syndication is enabled (which enables the video to be shown outside of an internet environment, such as in a broadcast or cable television environment), whether annotations are enabled (which enables users to add annotations to the video), whether comments are enabled (which enables users to add comments to the video), whether ratings are enabled (which enables users to comment on the video), whether captions and/or subtitles are provided and/or enabled, whether geo-tagging is enabled, whether auto-sharing is enabled, and so forth. For some videos, enabling certain of these options may increase viewership and/or advertising revenues.

Video discoverability class optimization rules include rules to check how the video is presented to viewers and/or how the video is discovered. Examples of video discoverability class optimization rules include rules that check for custom thumbnails and/or to optimize custom thumbnails, rules to check whether the video has been added to a playlist, rules to check whether call-to-action annotations are included in or associated with the video, etc. A call-to-action annotation may be a button that invites a user to press the button to initiate an action. The button may be present during some or all of the video (e.g., for 2:12 to 5:00), and may be present at a particular region of the display. The call to action annotation may be clicked by a user to open a new web page. Other examples of optimization rules within the video discoverability class include rules to check video titles, video descriptions, tags (e.g., for video type), etc. The discovery class optimization rules may output suggestions to add or modify custom thumbnails, to add or modify tags, a title and/or a descriptor, to add or modify a call-to-action annotation, and so forth.

Author behavior class optimization rules include rules that check for behavior of the entity that controls the video. Certain author behaviors may increase exposure of a video, and may thus increase viewership and/or ad revenues associated with that video. Examples of optimization rules within the author behavior class include rules to check for sharing of videos via social media platforms, to check for comments on videos, etc.

Video content class optimization rules include rules the analyze the contents of videos for potential improvements. Examples of optimization rules within the video content class include rules that check for optimal lighting conditions, to check for blur, to check for color problems, to check for cropping problems, to check for image stability, to check for optimal video length, etc. Such rules may perform image analysis on one or more frames of the videos to determine image properties of the video and compare those image properties to image properties that have been determined to be optimal. Other examples include rules that check for background noise, that check for insufficient volume of one or more speakers within a video, etc. Such rules may perform audio analysis on an audio portion of the video to determine audio properties for the video and compare those audio properties to audio properties that have been determined to be optimal. Video content class optimization rules may suggest that any identified problems of lighting, stability, audio quality, blur, and so forth be corrected (e.g., to cause the image and/or audio properties of the video to be closer to the determined optimal image and/or audio properties).

Optimization rules may be managed by a rules manager 220. Via the user interface, an administrator may organize the optimization rules, add new optimization rules, remove optimization rules, and so forth. Rules manager 220 may also perform automated tasks, such as rule classification, rule generation, and so forth without user input.

In one implementation, rules manager 220 includes a machine learning module 235. Machine learning module 235 analyzes numerous videos and viewership/monetization statistics associated with those videos. Based on the analysis, machine learning module 235 may identify a set of properties that are indicative of increased viewership, increased advertising revenues, and so forth. The machine learning module 235 then generates a set of rules that may be used to determine whether a video has particular properties that are indicative of successful monetization, discoverability and/or viewership. These rules may further include actions such as optimizing videos to add those properties that are indicative of success and/or generating recommendations to optimize the videos.

In one implementation, rules manager 220 applies cluster analysis to group videos based on one or more similar properties and/or or similar viewership statistics. Rules manager 220 may then identify differences between those clusters associated with favorable viewership statistics and those clusters associated with unfavorable viewership statistics. Rules manager 220 may generate rules that make recommendations that, if implemented, will cause a video from a cluster with unfavorable viewership statistics to be reclassified as a member of a cluster with favorable viewership statistics. Such rules may also perform recommended operations to modify the video.

Note that cluster analysis is just one category of machine learning algorithm that machine learning module 235 may implement. Machine learning module 235 may also include a neural network algorithm, a vector machine learning algorithm, an association rule learning algorithm, a decision tree learning algorithm, a genetic programming algorithm, an inductive logic programming algorithm, or other machine learning algorithm. Additionally, machine learning module 235 may use multiple different classes of machine learning algorithms, and/or may apply a hybrid machine learning algorithm to generate optimization rules.

Once video analyzer 210 has identified one or more video optimizations, recommender 215 generates optimization suggestions for those optimizations. Recommender 215 may post the optimization suggestions to a user account of an entity that controls the video. The posting may include an "accept suggestions" button that, if pressed, will cause the suggested optimizations to be implemented. The posting may additionally include a separate acceptance option for each optimization suggestion. Therefore, the entity may select a subset of the suggested optimizations for implementation or may accept all suggested optimizations for implementation.

Recommender 215 may additionally or alternatively generate a message that includes the optimization suggestions. The message may be an email message, a text message, an instant message, or other type of message. The message may include an "accept suggestions" option that, if selected by the entity, will cause an acceptance response message to be generated and sent to recommender 215. The user may also send a reply message to the video optimizer 205 identifying some or all of the suggested optimizations to be implemented.

Video editor 225 modifies videos to implement optimization suggestions. In one implementation, video analyzer 210 invokes video editor 225 to implement the optimization suggestions after analyzing the video. Video editor 225 may then generate a modified video 255, and temporarily cache the modified video or otherwise store the modified video (e.g., in the repository. If an entity that controls the video accepts the suggested optimizations, then an original video may be replaced with the pre-generated modified video. Video editor 225 may also edit the video in response to the entity accepting some or all of the optimization suggestions.

Video editor 225 may edit both metadata associated with a video and content of the video to optimize the video. Video editor 225 may perform enablement operations such as enabling in-video ads, enabling in-stream ads, enabling overlay ads, enabling a monetize policy, enabling embedding, enabling off-web syndication, enabling annotations, enabling comments, enabling ratings, enabling captions and/or subtitles, enabling geo-tagging, and so forth. Video editor 225 may also edit metadata associated with the video, such as adding or replacing custom thumbnails for the video, adding the video to a playlist, adding call-to-action buttons to the video, editing the video's title (e.g., to make the title more descriptive or enticing), editing a description of the video, editing tags associated with the video, etc. Additionally, video editor 225 may make edits to the video content. Such edits may include improving lighting conditions in the video, changing colors in the video, stabilizing the video, deleting frames from the video, amplifying volume for one or more speakers in the video, applying noise suppression to audio of the video, and so forth.

Video optimizer 205 may monitor a video's success after optimizations have been made. If metrics such as viewership, discoverability, viewing time, monetization, etc. of the video went up after implementing an optimization, then an accuracy of that optimization may be confirmed. If one or more of these metrics stayed the same or went down after implementing the optimization, then the rules manager 220 may adjust one or more of the optimization rules.

In one implementation, video optimizer 205 includes a design of experiments (DOE) generator 240. DOE generator 240 determines one or more changes to a video that might improve viewership and/or monetization of the video. These changes may be automatically determined by invoking video analyzer 210 and receiving optimization suggestions from the video analyzer 210. Alternatively, or in addition, a user may specify optimizations via the user interface 230. DOE generator 240 may then invoke video editor 225 to generate one or more modified videos 255 based on the suggested or specified optimizations. Each of the modified videos 255 may implement one or a few different optimizations.

DOE generator 240 generates an experiment using an original video and the one or more modified videos. The experiment may cause a server to present the original video 250 to most viewers (e.g., 90% of viewers), and to present the modified video (or videos) to a small percentage of viewers. For example, if two different modified videos are generated, each with different optimizations, DOE generator 240 may cause a first modified video to be shown to 5% of viewers and a second modified video to be shown to 5% of viewers. DOE generator 240 then compares viewership and/or monetization results of the original video (referred to as standard results) to results of the modified videos (referred to as experimental results).

If experimental results for a modified video are superior to standard results for the original video, then recommender 215 generates an optimization suggestion to implement the tested changes to the video. Recommender 215 then sends the recommendations to an entity that controls the video. The recommendations may include both suggested optimizations as well as projected improvements in viewership and/or monetization that will occur as a result of acceptance of the optimizations. The projected improvements may be based on the comparison of the standard results for the original video to the experimental results for the modified video (or videos). Note that multiple experiments may be run in parallel, each of which may apply different optimizations. Experiments may be run after receiving user acceptance of an option to run optimization experiments.

FIGS. 3-7 are flow diagrams of various implementations of methods related to optimizing videos. The methods are performed by processing logic that may include hardware (circuitry, dedicated logic, etc.), software (such as is run on a general purpose computer system or a dedicated machine), or a combination of both. In one implementation, the methods are performed by the server machine 115 of FIG. 1. The methods may be performed, for example, by video optimizer 122 executing on server machine 115 or another machine.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 3:
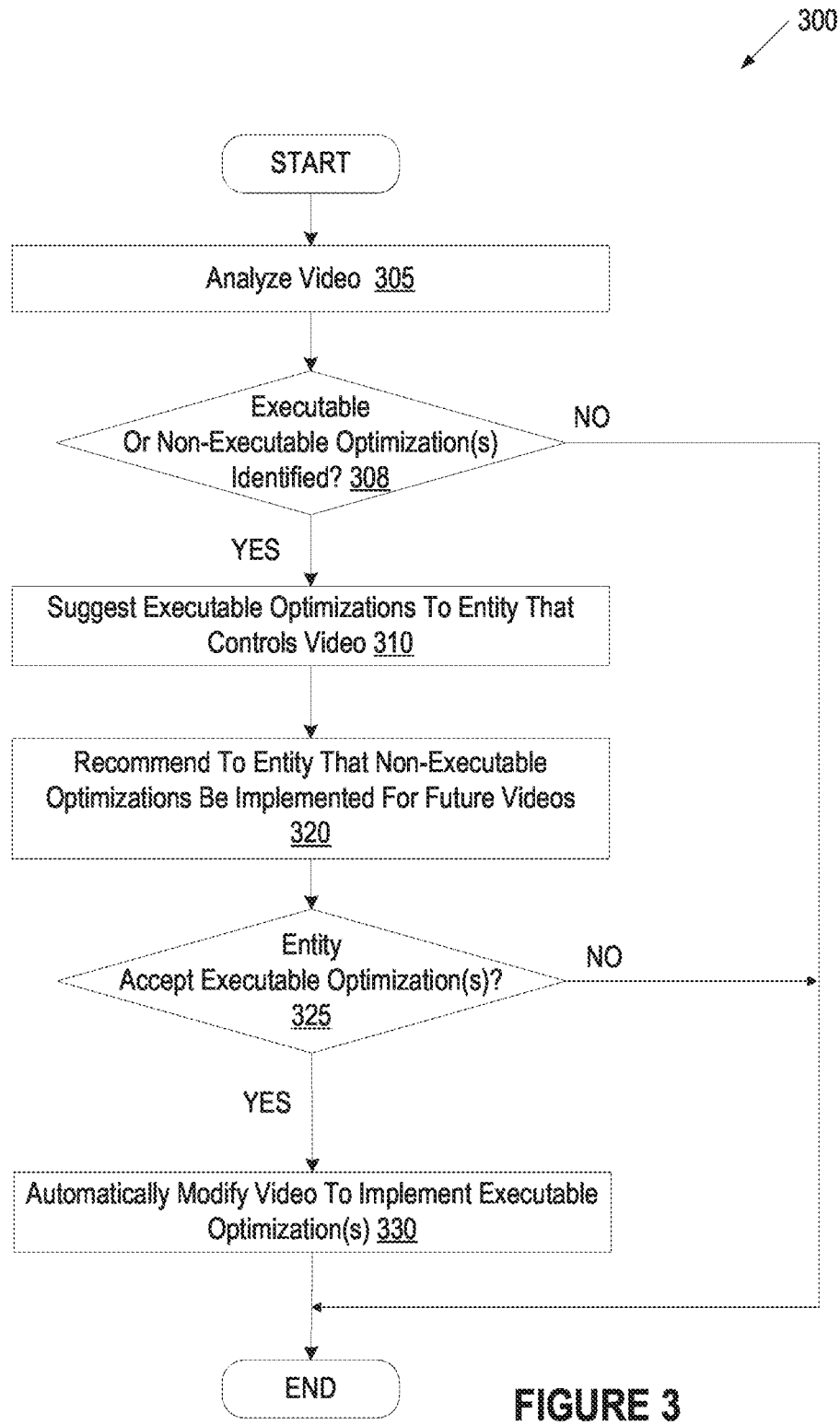
FIG. 3 is a flow diagram illustrating one implementation for a method of optimizing a video.

FIG. 3 is a flow diagram illustrating one implementation for a method 300 of optimizing a video. At block 305 of method 300, processing logic analyzes a video. The video may be stored by a media hosting service such as a video hosting website. Analyzing the video may include processing the video by a rules engine using one or more optimization rules. At block 308, processing logic determines whether any executable or non-executable optimizations have been identified. Executable optimizations are optimizations that may be performed on an analyzed video. Non-executable optimizations are optimizations that may be performed on future videos when those videos are produced. If any executable and/or non-executable optimizations are identified, the method continues to block 310. Otherwise, the method ends.

At block 310, processing logic suggests any identified executable optimizations to an entity that controls the video. At block 320, processing logic recommends to the entity that any non-executable optimizations be implemented for future videos. The suggestion and/or recommendation may be sent to the entity by posting the suggestion/recommendation to an account of the entity and/or by sending a message to the entity (e.g., via email, text message, instant message, etc.).

At block 325, processing logic determines whether the entity has accepted the executable optimizations. If the entity does not accept the executable optimizations, the method ends. If the entity does accept the executable optimizations, the method continues to block 330, and processing logic automatically modifies the video to implement the executable optimizations. This may include editing metadata associated with the video and/or editing contents of the video.

Figure 4:
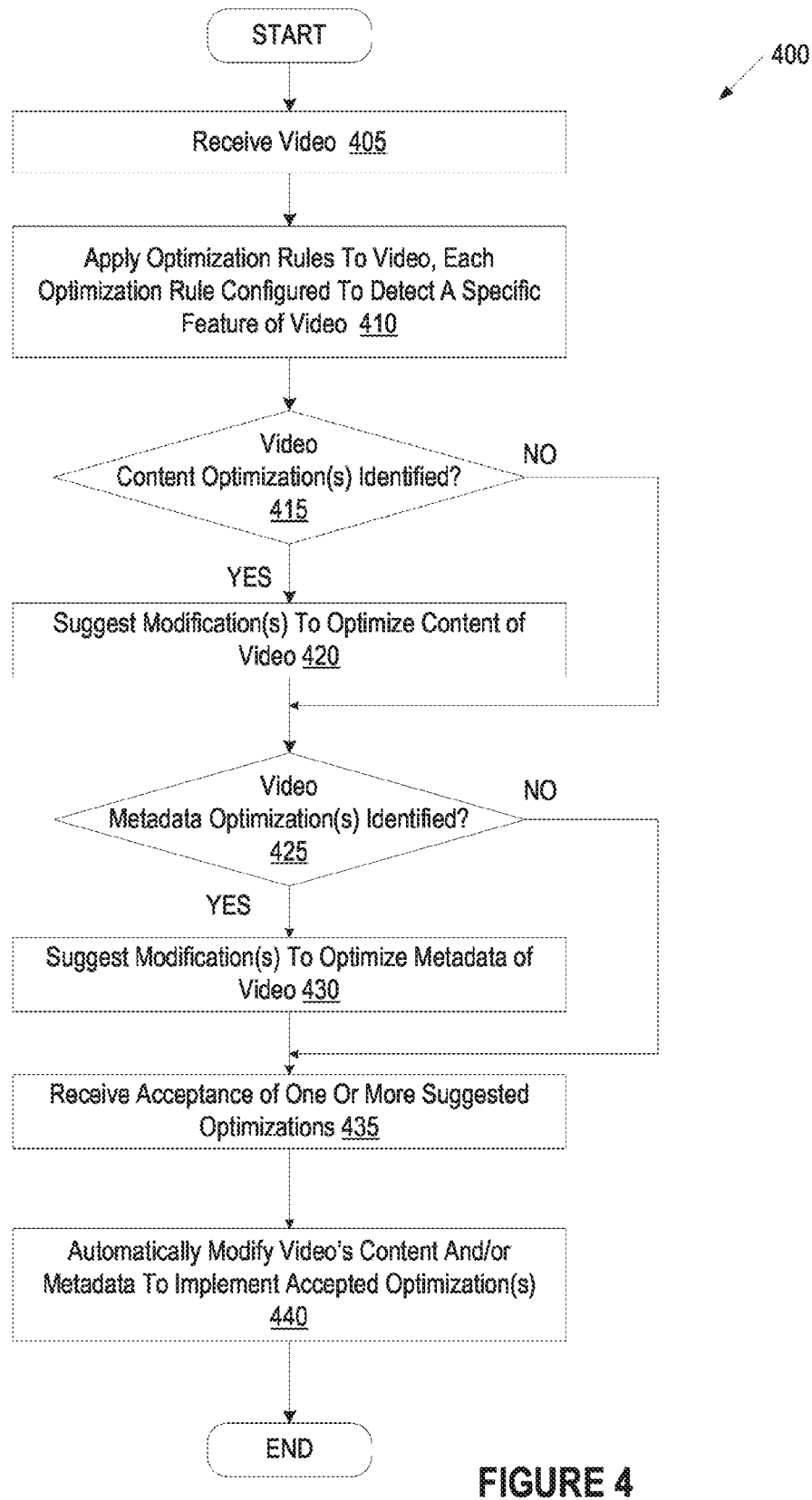
FIG. 4 is a flow diagram illustrating another implementation for a method of optimizing a video.

FIG. 4 is a flow diagram illustrating another implementation for a method 400 of optimizing a video. At block 405 of method 400, processing logic receives a video. Processing logic may retrieve the video from storage, the video may be uploaded by an entity, or the processing logic may otherwise receive the video. At block 410, processing logic applies one or more optimization rules to the video, where each optimization rule is configured to detect a specific feature of the video.

At block 415, processing logic determines whether any video content optimizations have been identified. Such video content optimizations may include optimizations to improve lighting conditions in the video, to change colors, to improve audio quality, to trim the video, and so forth. If video content optimizations have been identified, the method continues to block 420, and the processing logic suggests modifications to the video that will optimization the video's content. Otherwise, the method continues to block 425.

At block 425, processing logic determines whether any video metadata optimizations have been identified. Video metadata optimizations may include optimizations to enable one or more features for the video, to update tags associated with the video, to modify a title and/or description of the video, to modify or add a custom thumbnail to the video, and so on. If a video metadata optimization is identified, then at block 430 processing logic suggests modifications to optimize the video's metadata. Otherwise, the method continues to block 435.

At block 435, processing logic receives acceptance of one or more of the suggested optimizations. At block 440, processing logic automatically modifies the video's content and/or the video's metadata to implement the accepted optimizations. The method then ends.

Figure 5:
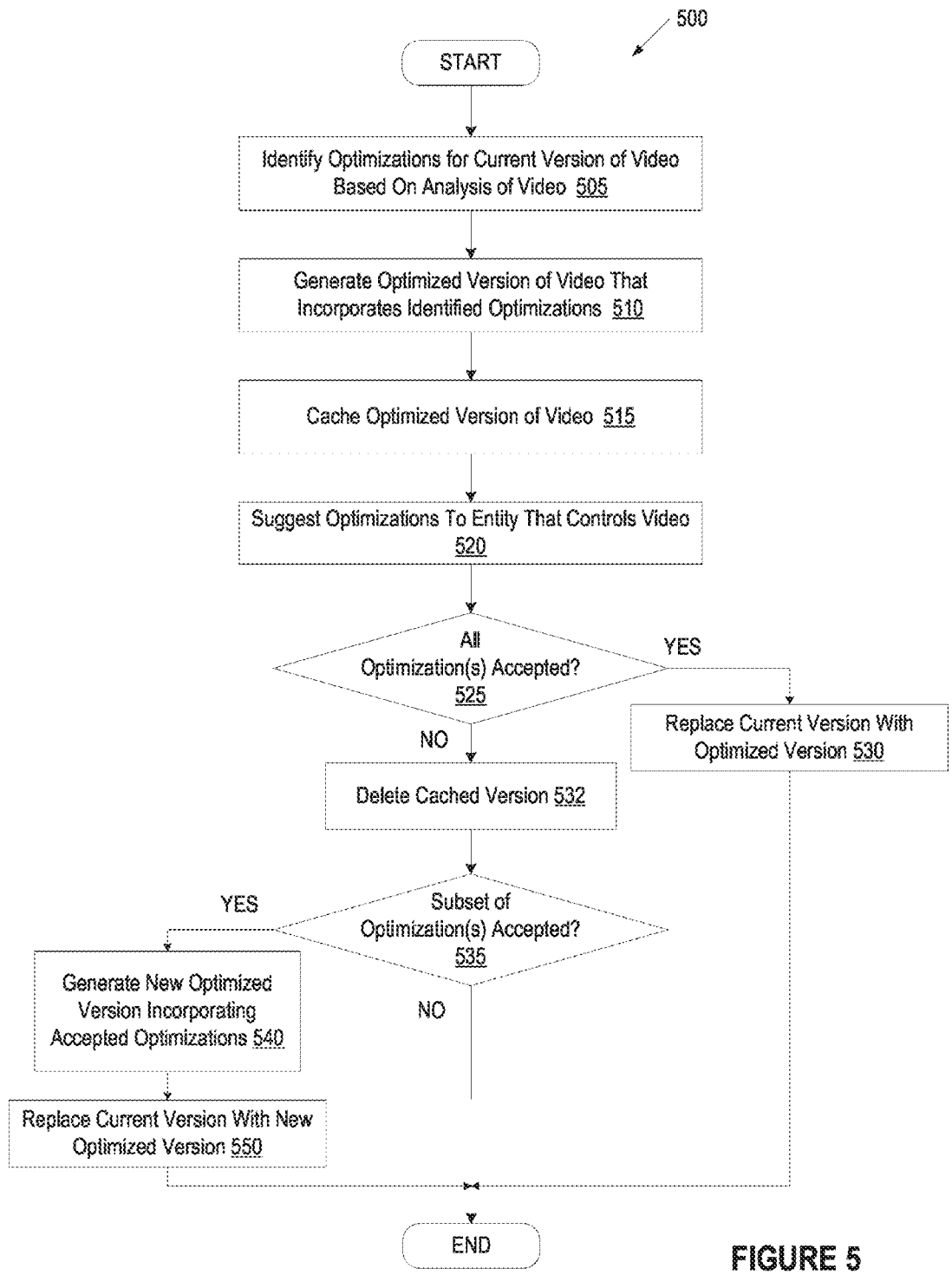
FIG. 5 is a flow diagram illustrating yet another implementation for a method of optimizing a video.

FIG. 5 is a flow diagram illustrating yet another implementation for a method 500 of optimizing a video. At block 505 of method 500, processing logic identifies optimizations for a current version of a video based on an analysis of the video. At block 510, processing logic generates an optimized version of the video that incorporates the identified optimizations. At block 515, processing logic caches the optimized version of the video.

At block 520, processing logic suggests the identified optimizations to an entity that controls the video. At block 525, processing logic determines whether all of the suggested optimizations have been accepted. If the optimizations have all been accepted, then at block 530 processing logic replaces the current version of the video with the optimized version. If all of the optimizations have not been accepted, then the method continues to block 532.

At block 532, the cached (optimized) version of the video may be deleted. At block 535, processing logic determines whether a subset of all suggested optimizations have been accepted. If some optimizations have been accepted, then the method continues to block 540. Otherwise the method ends.

At block 540, processing logic generates a new optimized version of the video incorporating the accepted optimizations. At block 550, processing logic replaces the current version of the video with the new optimized version of the video. The method then ends.

Figure 6:
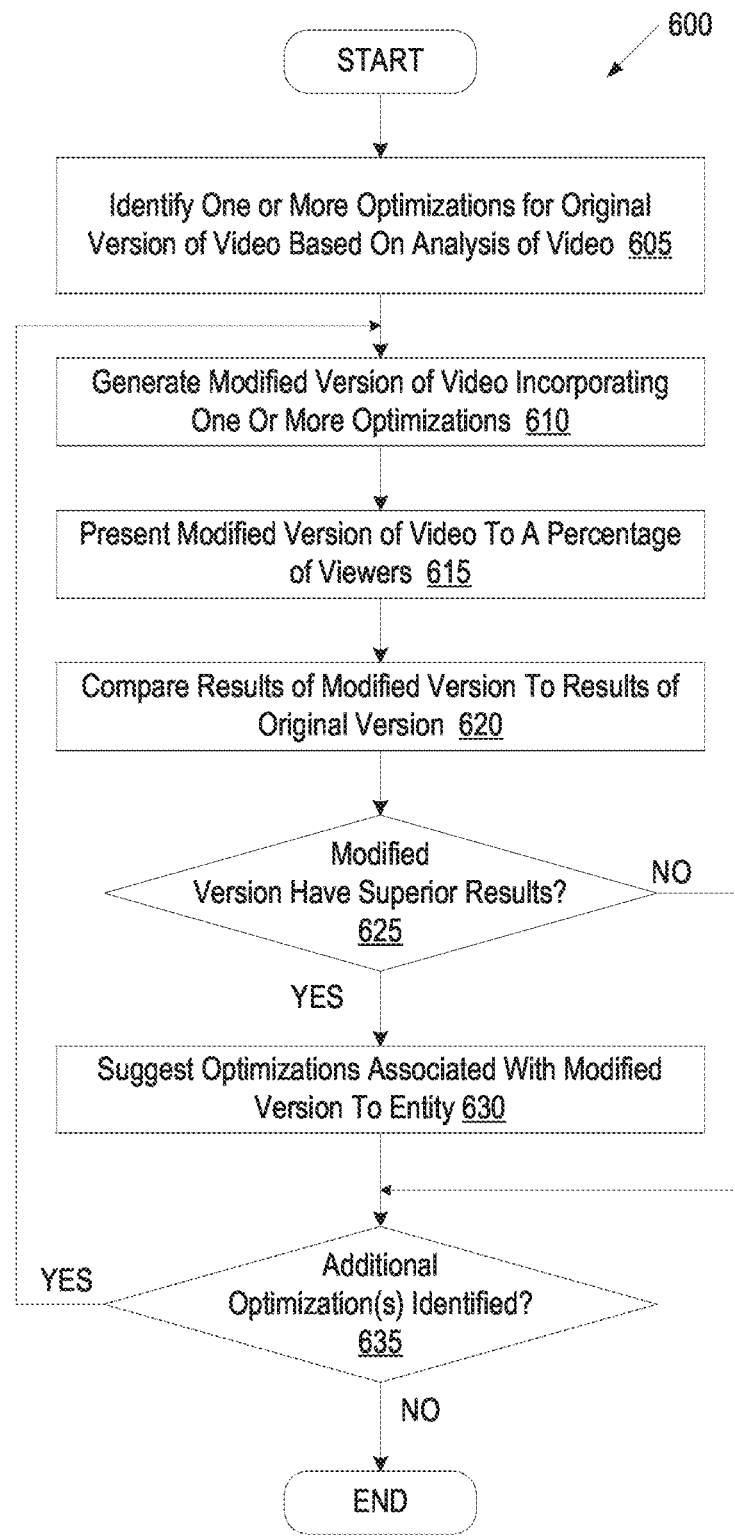
FIG. 6 is a flow diagram illustrating one implementation for a method of determining optimizations that can be made to a video.

FIG. 6 is a flow diagram illustrating one implementation for a method 600 of determining optimizations that can be made to a video. At block 605 of method 600, processing logic identifies one or more optimizations for an original (or current) version of a video based on an analysis of the video. At block 610, processing logic generates a modified version of the video incorporating the identified one or more optimizations. At block 615, processing logic presents a modified version of the video to a percentage of viewers (e.g., to 5% of viewers).

At block 620, processing logic compares results of the modified version to results of the original (or current) version. At block 625, processing logic determines whether the modified version has superior results to the original (or current) version. Superior results may be increased viewership, increased advertising revenue per showing, or other improved metric. If the modified version has superior results, the method continues to block 630, and the optimizations associated with the modified version of the video are suggested. Otherwise, the method proceeds to block 635.

At block 635, processing logic determines whether there are any additional identified optimizations that have not been tested. If there are additional optimizations, the method returns to block 610, and another modified version of the video incorporating one or more of the additional optimizations is generated. Otherwise, the method ends.

Figure 7:
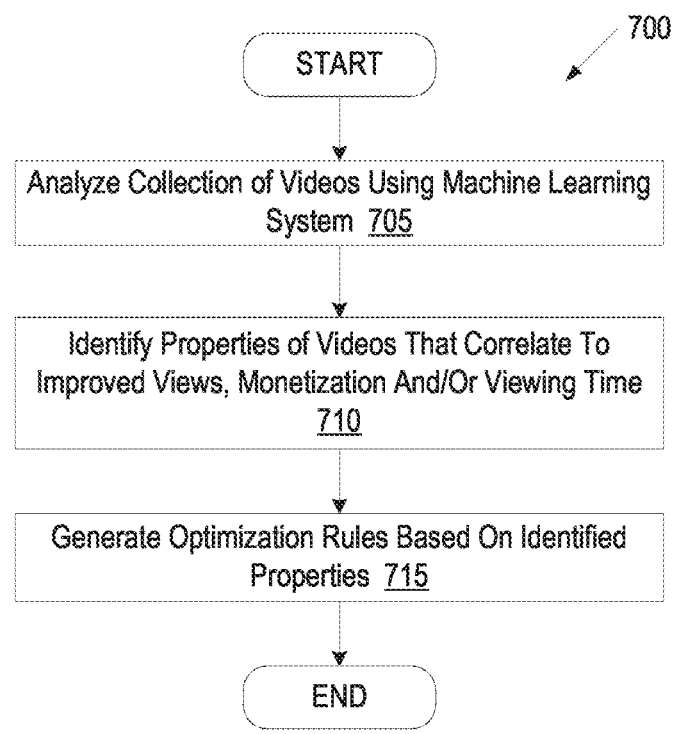
FIG. 7 is a flow diagram illustrating one implementation for a method of generating optimization rules that can be used to optimize videos.

FIG. 7 is a flow diagram illustrating one implementation for a method 700 of generating optimization rules that can be used to optimize videos. At block 705 of method 700, processing logic analyzes a collection of videos using a machine learning system. The machine learning system may apply one or more machine learning algorithms, such as cluster analysis, neural networks, and so forth. At block 710, processing logic identifies properties of videos that correlate to improved views, monetization and/or viewing time based on the analysis. At block 715, processing logic generates one or more optimization rules based on the identified properties. In one implementation, each optimization rule can be used to check whether a video has a particular property that is correlated with increased monetization, views and/or viewing time.

Figure 8:
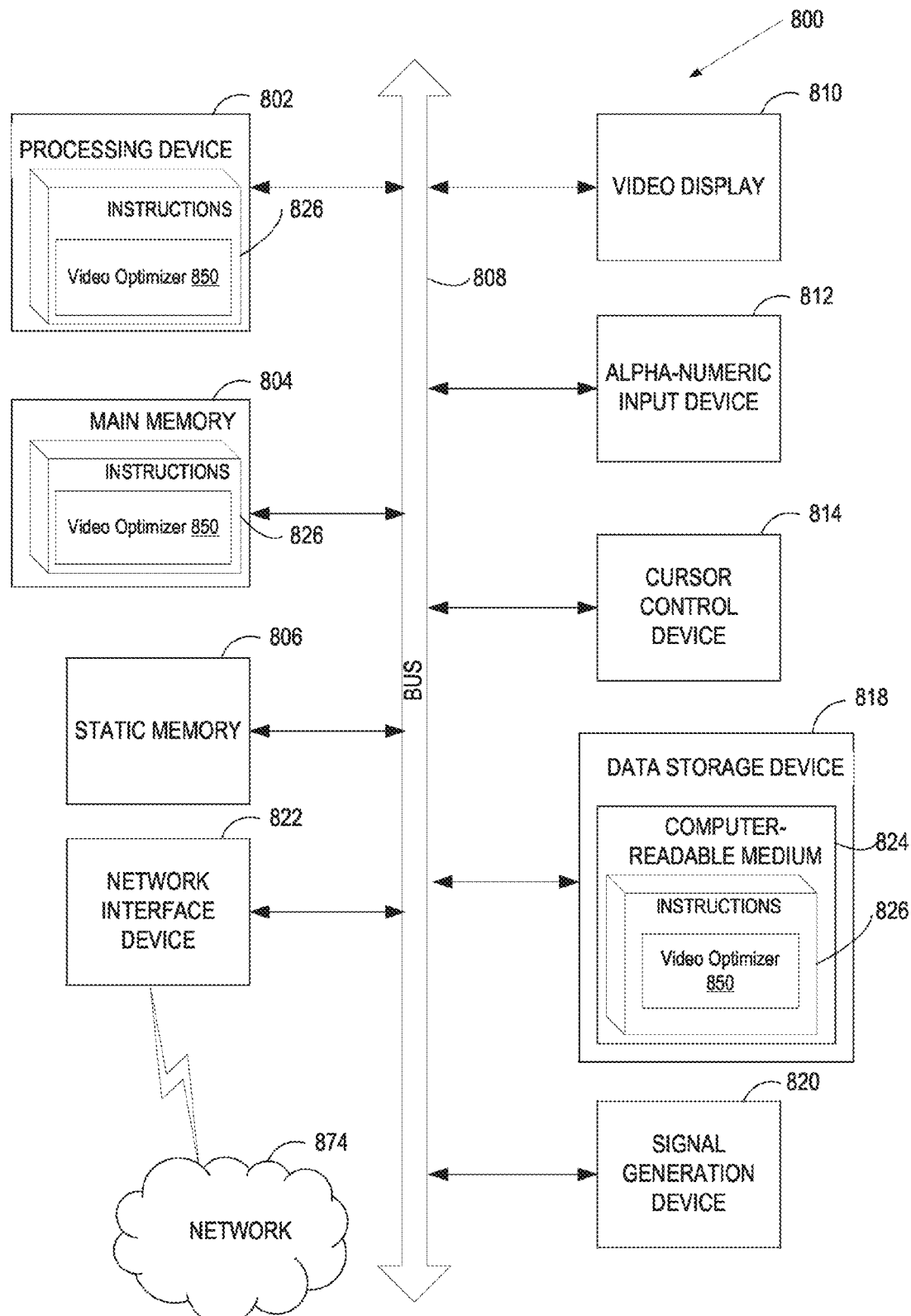
FIG. 8 is a block diagram of an exemplary computer system that may perform one or more of the operations described herein.

FIG. 8 illustrates a diagrammatic representation of a machine in the exemplary form of a computer system 800 within which a set of instructions, for causing the machine to perform any one or more of the methodologies discussed herein, may be executed. In some implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 808.

Processing device 802 represents one or more general-purpose processors such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 818 may include a computer-readable medium 824 on which is stored one or more sets of instructions 826 (e.g., software) embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting computer-readable media.

In one implementation, the instructions 826 include instructions for a video optimizer 850, which may correspond to video optimizer 205 of FIG. 2, and/or a software library containing methods that call a video optimizer. While the computer-readable medium 824 is shown in an exemplary implementation to be a single medium, the term "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that cause the machine to perform any one or more of the methodologies of the present disclosure. The terms "computer-readable medium" and "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "analyzing", "suggesting", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

We claim:

1. A method comprising:
processing, by a computing device executing an optimizer, a video using a machine learning algorithm to determine one or more optimizations for original contents of the video, the one or more optimizations pertaining to a modification of the original contents of the video to improve viewership statistics of the video, wherein the machine learning algorithm is trained on properties of a plurality of other videos and viewership statistics of respective other videos of the plurality of other videos to be able to identify a subset of the properties of the plurality of other videos that is indicative of improved viewership statistics, and to determine which video optimization causes a respective other video to include one or more of the subset of the properties indicative of the increased viewership statistics;
modifying the original contents of the video to produce a modified version of the video that implements the one or more optimizations; and
causing the modified version of the video to be presented to viewers to demonstrate results of the one or more optimizations.

2. The method of claim 1, wherein the one or more optimizations further pertain to metadata associated with the video.

3. The method of claim 2, further comprising:
modifying the metadata associated with the video by enabling at least one of an advertising option that enables one or more types of advertisements to be shown in association with the modified version of the video, an embedding option that enables the modified version of the video to be embedded into a third party web site, an off-web syndication option that enables the modified version of the video to be shown outside of an internet environment, an annotations option that enables third parties to annotate the modified version of the video, a comments option that enables third parties to comment on the modified version of the video, a ratings option that enables third parties to rate the modified version of the video, a captions option that enables captions for the modified version of the video or a geo-tagging option that enables geo-tagging for the modified version of the video.

4. The method of claim 2, further comprising:
modifying the metadata associated with the video by performing at least one of adding a custom thumbnail to the modified version of the video, adding the modified version of the video to a playlist, associating a call-to-action annotation to the modified contents of the video, modifying a title for the modified version of the video, modifying a description for the modified version of the video or adding a tag to the modified version of the video.

5. The method of claim 1, further comprising monitoring the viewership statistics of the modified version of the video after the modified version of the video is presented to viewers.

6. The method of claim 1, further comprising determining one or more properties of each of the plurality of other videos.

7. The method of claim 6, wherein determining one or more properties of each of the plurality of other videos comprises:
performing image recognition on a corresponding other video to determine identities of one or more objects in the corresponding other video.

8. The method of claim 6, wherein determining one or more properties of each of the plurality of other videos comprises performing image analysis on one or more frames in a corresponding other video.

9. The method of claim 1, further comprising using a set of optimization rules to determine which video optimization causes the respective other video to include the one or more of the subset of the properties indicative of the increased viewership statistics, wherein the set of optimization rules comprises one or more optimization rules that compare at least one of image properties or audio properties for each other video to optimal image properties or optimal audio properties.

10. The method of claim 9, wherein the set of optimization rules further comprise one or more optimization rules that compare enablement option selections of each other video to optimal enablement option selections.

11. The method of claim 9, wherein the set of optimization rules further comprise one or more optimization rules that check at least one of custom thumbnails for each other video, playlists associated with each other video, call-to-action annotations in each other video, video titles, video descriptions or video tags to determine discoverability of each other video.

12. The method of claim 1, wherein modifying the original contents of the video to produce a modified version of the video that implements the one or more optimizations comprises:
performing at least one of changing a lighting condition for the video, changing colors for the video, correcting blur in the video, re-cropping the video, stabilizing the video or removing background noise from the video.

13. The method of claim 1, further comprising:
suggesting the one or more optimizations to an entity associated with the video; and
in response to the entity accepting the one or more optimizations, modifying the original contents of the video to implement the one or more optimizations.

14. The method of claim 13, further comprising:
modifying the original contents of the video prior to suggesting the one or more optimizations to the entity; and
caching the modified version of the video, wherein modifying the video comprises replacing the video with the modified version of the video.

15. The method of claim 1, further comprising:
identifying one or more improvements that, had they been implemented during creation of the video, would have optimized the video; and
recommending to the entity that the one or more improvements be implemented for future videos.

16. The method of claim 1, wherein causing the modified version of the video to be presented to viewers further comprises:

presenting the modified version of the video to a percentage of viewers to produce results for the modified version of the video;
comparing the results of the modified version of the video to standard results of the video; and
identifying the one or more optimizations based on the comparison.

17. A non-transitory computer readable storage medium having instructions that, when executed by a processing device, cause the processing device to perform a method comprising:
processing, by the processing device, a video using a machine learning algorithm to determine one or more optimizations for original contents of the video, the one or more optimizations pertaining to a modification of the original contents of the video to improve viewership statistics of the video, wherein the machine learning algorithm trained on properties of a plurality of other videos and viewership statistics of respective other videos of the plurality of other videos to be able to identify a subset of the properties of the plurality of other videos that is indicative of improved viewership statistics, and to determine which video optimization causes a respective other video to include one or more of the subset of the properties indicative of the increased viewership statistics; and
modifying the original contents of the video to produce a modified version of the video that implements the one or more optimizations; and
causing the modified version of the video to be presented to viewers to demonstrate results of the one or more optimizations.

18. The non-transitory computer readable storage medium of claim 17, wherein the method further comprises monitoring the viewership statistics of the modified version of the video after the modified version of the video is presented to viewers.

19. A system, comprising:
a memory to store instructions for a video optimizer; and
a processing device, coupled to the memory, to execute the instructions, wherein the processing device is configured to:
process a video using a machine learning algorithm to determine one or more optimizations for original contents of the video, the one or more optimizations pertaining to a modification of the original contents of the video to improve viewership statistics of the video, wherein the machine learning algorithm trained on properties of a plurality of other videos and viewership statistics of respective other videos of the plurality of other videos to be able to identify a subset of the properties of the plurality of other videos that is indicative of improved viewership statistics, and to determine which video optimization causes a respective other video to include one or more of the subset of the properties indicative of the increased viewership statistics;
modify the original contents of the video to produce a modified version of the video that implements the one or more optimizations; and
cause the modified version of the video to be presented to viewers to demonstrate results of the one or more optimizations.

20. The system of claim 19, wherein to the processing device is further configured to monitor the viewership statistics of the modified version of the video after the modified version of the video is presented to viewers.

* * * * *